United States Patent
Walker et al.

(10) Patent No.: US 6,209,028 B1
(45) Date of Patent: Mar. 27, 2001

(54) SYSTEM AND METHOD FOR SUPPLYING SUPPLEMENTAL AUDIO INFORMATION FOR BROADCAST TELEVISION PROGRAMS

(75) Inventors: Jay S. Walker, Ridgefield; James A. Jorasch, Stamford; Thomas M. Sparico, Riverside, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 08/821,436

(22) Filed: Mar. 21, 1997

(51) Int. Cl.$^7$ ............................. H04H 1/02; H04N 7/173
(52) U.S. Cl. ............................. 709/219; 348/12; 455/5.1
(58) Field of Search ..................... 395/200.47–200.49; 348/1, 2, 6, 7, 10, 12, 13, 473–486; 455/2, 3.1, 4.1, 4.2, 5.1, 6.1, 6.2, 6.3; 379/88.05, 88.06; 709/217–219

(56) References Cited

U.S. PATENT DOCUMENTS

| | | |
|---|---|---|
| 4,734,764 | 3/1988 | Pocock et al. ............................ 348/7 |
| 4,839,733 | 6/1989 | Karamon et al. . |
| 5,055,939 | 10/1991 | Karamon et al. . |
| 5,509,060 | 4/1996 | Hall et al. . |
| 5,561,709 | 10/1996 | Remillard . |
| 5,585,858 * | 12/1996 | Harper et al. ....................... 348/13 X |
| 5,594,660 | 1/1997 | Sung et al. . |
| 5,596,419 | 1/1997 | Yoshimura et al. . |
| 5,596,705 | 1/1997 | Reimer et al. . |
| 5,677,739 * | 10/1997 | Kirkland ........................... 348/553 X |
| 5,712,950 | 1/1998 | Cookson et al. . |
| 5,731,846 | 3/1998 | Kreitman et al. . |
| 5,774,170 | 6/1998 | Hite et al. . |
| 5,809,471 | 9/1998 | Brodsky . |
| 5,815,634 | 9/1998 | Daum et al. . |
| 5,900,908 * | 5/1999 | Kirkland ........................... 348/553 X |

OTHER PUBLICATIONS

"Technology; A Way to Hear Stock Quotes While Watching Cartoons," The New York Times, Apr. 14, 1991, late edition, section 3, p. 8, col. 1.
"Special videos narrate the action for viewers with visual impairments," Bonnie Britton, The Indianapolis Star, Oct. 15, 1995, p. I04.
"Dow Jones Investor Network broadcasts Greenspan live tonight," Business Wire, Oct. 19, 1995.
"General Instrument Corporation Reports Record Fourth Quarter and Full Year 1994 Results," PR Newswire, Feb. 1, 1995.
"Cable operators look for other revenue streams," Christopher Stern, Broadcasting and cable, vol. 123, No. 30, p. 96, ISSN 1068–6287.
"Venevision into U.S. PPV," Paula Parisi, The Hollywood Reporter, Dec. 29, 1992.
Hardcopy print out from http://www.multimedia.dowjones.com/hotline.html.
"Dow Jones Investor Network debuts on Multimedia Division Home Page," Business Wire, Aug. 29, 1995.
http://www.xensei.com/users/jcurro/rabc.html (no print out available).

* cited by examiner

Primary Examiner—John W. Miller
(74) Attorney, Agent, or Firm—Steven M. Santisi

(57) ABSTRACT

An apparatus, method, and program for providing supplemental information related to a broadcast television program. Through a telephone or electronic network interface, a caller can request specific supplemental information related to one or more characters within the broadcast television program. The supplemental information is synchronized to the audio component of the television program so that there is no conflict, and is communicated to the caller via the network interface.

31 Claims, 12 Drawing Sheets

26a

| NETWORK NAME F1 | NETWORK IDENTIFICATION NUMBER F2 | NUMBER OF PARTICIPATING PROGRAMS F3 |
|---|---|---|
| TWENTIETH CENTURY FOX (FOX) | 05 | 15 |
| NATIONAL BROADCAST COMPANY (NBC) | 04 | 24 |
| AMERICAN BROADCAST COMPANY (ABC) | 07 | 11 |
| TURNER NETWORK TELEVISION (TNT) | 17 | 6 |

| PROGRAM NAME 402 | PROGRAM ID NUMBER 404 | NETWORK ID NUMBER 406 | BROADCAST TIMES 408 | PARTICIPATING CHARACTERS 410 | PHONE NUMBER 412 |
|---|---|---|---|---|---|
| DAYS OF OUR LIVES | DL74 | 04 | 1:00PM EST | MARLENA, BO, ROMAN, HOPE | 1-900-789-DAYS |
| | | | | | |
| | | | | | |
| | | | | | |

PROGRAM DATABASE 400

CHARACTER DATABASE 500

| CHARACTER NAME 502 | CHARACTER NUMBER 504 | PROGRAM ID NUMBER 506 |
|---|---|---|
| MARLENA | 43 | DL74 |
| BO | 54 | DL74 |
| ROMAN | 46 | TL64 |
| HOPE | 78 | TL64 |

| PROGRAM ID NUMBER 602 | EPISODE NUMBER 604 | CHARACTER NUMBER 606 | TIME-CODE RECEIVED 608 | RECORDING NUMBER 610 | TELEPHONE NUMBER DIALED 612 |
|---|---|---|---|---|---|
| DL74 | 12345 | 43 | 4:34:00 | 345CD | 1-900-789-DAYS |
| | | | | | |
| | | | | | |
| | | | | | |

RECORDING DATABASE 600

BILLING DATABASE 700

| CALLER TELEPHONE NUMBER 702 | 900 NUMBER DIALED 704 | PROGRAM ID NUMBER 706 | CHARACTER NUMBER 708 | RECORDING NUMBER 710 | TOTAL TIME EXPIRED 712 | FINAL DOLLAR AMOUNT 714 | CALLER VERIFIED RATE 716 |
|---|---|---|---|---|---|---|---|
| (203) 614-3295 | 345-6687 | OLTL55 | | | 0:45 | | $1.95/MIN |
| (203) 614-3242 | 345-7789 | DL65 | | | 34:55 | | $1.95/MIN |
| (203) 614-3241 | 456-9796 | SDC-84 | | | 15:11 | | $2.95/MIN |
| (203) 614-3269 | 874-9876 | HD-847 | | | 60:00 | | $20.00/SHOW |

R11 → row 1
R12 → row 2
R13 → row 3
R14 → row 4

FIG. 7

SYSTEM AND METHOD FOR SUPPLYING SUPPLEMENTAL AUDIO INFORMATION FOR BROADCAST TELEVISION PROGRAMS

BACKGROUND OF THE INVENTION

This invention relates to the field of broadcast television programs. More particularly, the present invention provides a system and a method for television viewers to receive additional dialog and information, via a selected interface, related to characters on a specific broadcast television program.

Many television (TV) programs, such as daytime soap operas and situation comedies, are regularly watched by large audiences. Considering the growing number of TV sets in homes and the amount of time the average person spends watching TV, the size of the audience is expected to increase over time. Correspondingly, programs need to change and evolve to suit the ever-more diverse tastes and interests of this expanding audience.

Television networks, cable companies and independent TV program providers offer a myriad of TV program categories to capture the interest of viewers. These TV program categories include, for example, game shows, talk shows, situation comedies, sporting events, and soap operas. The ultimate goal is to provide interesting programming, in order to capture a large segment of the viewing audience.

One popular category of TV programming is the daytime soap opera. This type of program revolves around the day-to-day lives of characters featured within the program. A plot or story-line for a typical soap opera can span several episodes, possibly an entire TV season.

Each episode continues and develops the story-line further, and also develops the personalities of characters within the soap opera in an ever-expanding and detailed manner.

Soap operas, as well as other TV programs, often develop a core group of passionate and dedicated viewers. Many viewers religiously watch every episode of their favorite TV programs—loathing to miss even a single episode. With these viewers in mind, several magazines on the market summarize daily or weekly episodes of television programs for people who may have missed a particular episode. There are also 900 telephone numbers available that offer similar services for a fee. These are just two areas in which peripheral services have developed in response to TV viewer's demand.

Moreover, many TV viewers are extremely involved in their favorite TV program's story-line and characters. The writers of TV programs must weave complex and interesting plots to maintain the viewer's loyalty and interest in the program. In most instances, multi-faceted and well-developed characters are essential to the popularity (and longevity) of the program. Thus, a typical script for a TV program may be written, revised and edited numerous times to ensure that the result is interesting, realistic, believable or humorous.

Writers and producers spend a great deal of time developing characters and story-lines for TV programs that ultimately are not used in the broadcast version of the TV program. Many times several scripts, each with different plot twists and dialogue, are developed for each TV program episode. This is occasionally done to preserve the secrecy of the final broadcast episode. However, more often than not, these changes and alternate scripts are never broadcasted.

Thus, the TV program producers and developers have no outlet to display this additional work-product (or by-product, as the case may be) to the viewing public.

To a certain extent, dedicated viewers of, for example, a soap opera, live vicariously through the trials and tribulations of the TV characters. Any additional information on their favorite TV program is of interest to these viewers, particularly, the thoughts, feelings and motivations that help define the TV characters.

However, the typical TV program format makes it difficult to develop the thoughts and feelings for a TV character in great detail. The story-line in a TV program must flow in a relatively quick and fluid manner. Unlike a novel, where an author can, between exchanges of dialogue, devote extensive time to a given character's thoughts, motivations, and considerations, the dialogue in TV programs must flow in a real-time manner. In many situations, this means that the writers must briefly summarize the thoughts or motivations of a character to keep the action flowing smoothly.

For example, a soap opera might have the lead female character saying to the lead male character: "I am going to New York for lunch. Would you like to join me?" However, her thoughts, which are not being broadcasted, may have her contemplating several devious things she is considering doing while in New York. These devious machinations may or may not occur depending upon the road the writers decide to follow for the story-line.

A wealth of non-broadcast material (from story-line changes and revisions) could be created and used to supplement the audio tracks of TV programs. In the example discussed above, a parallel audio track could be used to provide the additional thoughts of the lead female character to listeners who are simultaneously watching the TV broadcast.

In this regard, modern stereo televisions can receive a secondary audio channel (SAP). SAP technology has been used to provide descriptive video (DVS), which prints words on the television screen describing the action for the deaf. SAP has also been used to provide non-English audio tracks for the TV programs or sporting events, as well as a running commentary on TV movies. Some radio stations also broadcast audio tracks of live events (e.g. sporting events) or TV programs.

However, these conventional simulcasting systems provide everyone using the system with the same audio track; i.e., all viewers (or listeners) using these systems receive the same information. There is no way for a TV viewer to select individual information, for example, additional dialogue or thoughts of a particular character on a TV soap opera program. Moreover, these systems are typically provided for a monthly or annual service fee or are provided at no cost, because charging on a per-TV program or per-use basis is administratively difficult to process, or not possible at all.

Other systems have been developed using community antenna television facilities (CATV) that allow subscribers to interactively request still-television video frames with an accompanying audio message. However, the TV video and accompanying audio message provided by these systems are not related to, or synchronized to, broadcast TV programs.

Phone services (e.g. chat rooms and conference calling systems) also exist that allow callers to dial-in and listen to pre-recorded audio messages or even listen to live events in progress. When a caller uses a dial in service to listen to a sporting event, for example, which is being simultaneously broadcasted on TV, the radio audio track replaces the TV audio track. Thus, these services are not synchronized to the TV program's audio track and are not designed to supplement the dialogue for the TV program.

Until now, producers and broadcasters of TV programs have not been able to benefit from non-broadcast material developed in relation to a TV program's story-line or characters. Therefore, synchronized audio tracks providing supplemental information for TV programs have not been created. This supplemental audio information would be of great interest to devoted fans of TV programs. In addition, TV program broadcasters would have an alternative venue to bolster their TV program's characters, thereby creating even greater interest in the particular TV program. Accordingly, there is a need for a system that solves the above described problems. In particular, a system that permits TV producers to provide additional valuable entertainment content to interested viewers.

SUMMARY OF THE INVENTION

The present invention solves the foregoing deficiencies by providing a system and a method for enabling television program viewers to receive supplemental information related to the television program.

The present invention advantageously enables television program viewers to select supplemental information related to particular characters in a television program through a telephone network interface. The selected supplemental information is then received by the viewer via an appropriate interface.

In particular, one aspect of the present invention is directed to a method of supplying supplemental audio information that is synchronized to a broadcast television program so that the supplemental audio information is not in conflict with the audio component of the television program. This method includes providing selection and synchronization information through the broadcast television program, and supplying the supplemental audio information in accordance therewith.

Other aspects of the present invention are described below.

BRIEF DESCRIPTION OF THE DRAWINGS

FIG. 3 is a table depicting the network database within the service controller of FIG. 2.

FIG. 4 is a table depicting the program database within the service controller of FIG. 2.

FIG. 5 is a table depicting the character database within the service controller of FIG. 2.

FIG. 6 is a table depicting the recording database within the service controller of FIG. 2.

FIG. 7 is a table depicting the billing database within the service controller of FIG. 2.

DETAILED DESCRIPTION OF THE PREFERRED EMBODIMENTS

In a preferred embodiment of the present invention, writers for a TV program write supplemental dialogue for specific characters featured in the TV program. This supplemental dialogue consists of "thoughts" and "comments" not spoken aloud during the broadcast version of the TV program. For example, these thoughts could include a hidden agenda, a character's true feelings toward another character, or other motivational factors driving a character's actions. While many devoted fans are interested in this type of information, it is not easily conveyed to the viewing audience during the real-time exchange of dialogue between characters on the TV program.

In the present invention, audio recordings of these thoughts and comments are recorded using actors from the TV program. Of course, voice-doubles for the actors could also be used to make the audio recordings. The audio recordings are then edited and synchronized to the broadcast TV program. This process ensures that the additional thoughts and comments do not overlap the dialogue being spoken on the broadcast version audio track. These thoughts and comments are interspersed during the non-speaking periods and other appropriate periods in the TV program so that they can be listened to simultaneously with the TV program without conflict.

In alternative embodiments, the supplemental audio information can be used for other purposes. Several examples of other types of supplemental audio information for TV programs include: adult content and themes not available on the regular program, and multiple audio tracks of the same TV program, which provide different sets of audio information each time the TV program is viewed (and listened to). For example, each viewing could offer the hidden thoughts of a different character, or offer the viewer clues (e.g., hints concerning alternative actions or events that may or may not occur). This may give the viewer the sense that he is somehow participating in the show. Supplemental audio information can also be used to provide additional content, also referred to as "hyper-content," for news-type programs, consisting of information not included in the broadcast (e.g. an unabridged news report).

Traditional methods of broadcasting audio tracks, such as SAP or radio, are not suitable for the present application. The supplemental audio information must be made available only to customers requesting the service (i.e. not broadcasted to the world). In addition, there may be multiple versions of supplemental audio information for a particular TV program, so that different customers can choose different supplemental audio information for the same TV program, or watch the same TV program multiple times with different supplemental audio information each time. The supplemental audio information is synchronized with the audio track of the broadcast TV program—enhancing the audio track rather than merely replacing it.

Figure 1:
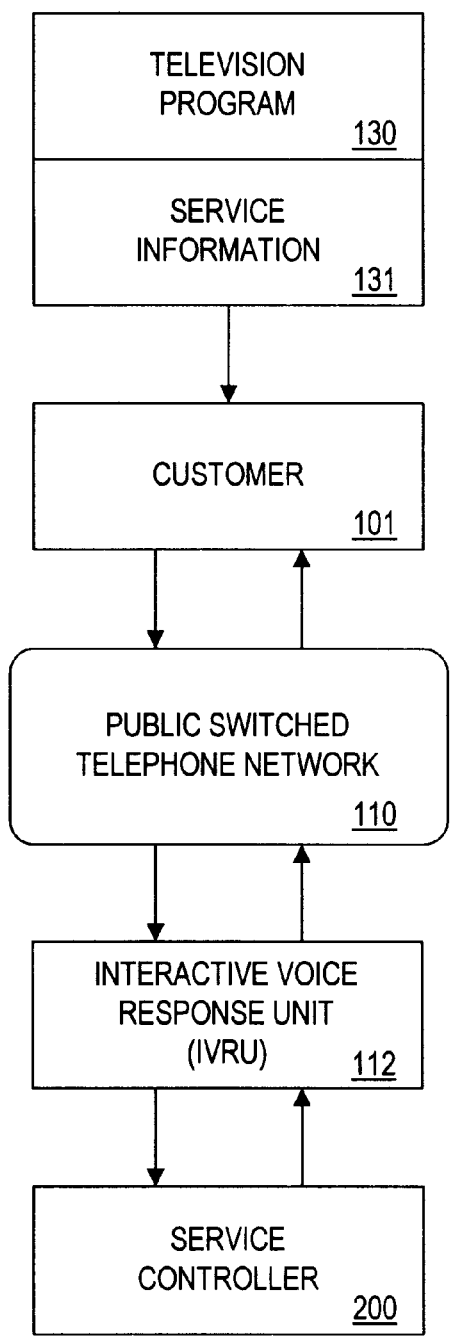
FIG. 1 is a block diagram overview of one system constructed in accordance with the present invention.

FIG. 1 shows an overall system block diagram of a preferred embodiment of the present invention. In this embodiment, a customer receives service information 31, which is displayed discretely during the broadcast of a television program 30. The service information 31 comprises a 900 telephone number and a program identification code. The program identification code is a ten digit alphanumeric code comprising selection information and synchronization information (none of which are shown). The service information 31 is used by the customer to request specific supplemental audio information related to the television program 30, as discussed below.

It is understood that the television program 30 is one of many television programs that are broadcasted or transmitted to the public. The television program 30 is received and displayed by conventional electronic equipment (i.e. a television set, not shown) located in close proximity to the customer. The electronic display equipment may receive the television program 30 through an antenna adapted to receive TV signals from a TV broadcast station, from a satellite transponder, a trunk cable from a CATV (i.e. cable TV) system, or from any other suitable transmission means.

The service information 31 is recorded on the same recording medium as the television program 30. For example, a television program can be recorded and then the service information 31 can be added during editing of the recorded television program. The service information 31 can also be added at the time of broadcasting the television program 30.

It is also understood that the service information 31 would be displayed even if the television program 30 is recorded on a recorded medium and played-back by the customer. While one customer is depicted in FIG. 1 receiving the service information 31 from the television program 30, it is understood that the television program 30 is broadcasted to any number of customers simultaneously.

As illustrated in FIG. 1., the customer, by utilizing his telephone (not shown), communicates through a public switch telephone network 10 (PSTN) and an interactive voice response unit, IVRU 12, to a service controller 20. The customer provides the selection information and synchronization information, to the service controller 20. In response, the service controller 20 sends the supplemental audio information to the customer. The communication process via the telephone is discussed in detail below.

Figure 2:
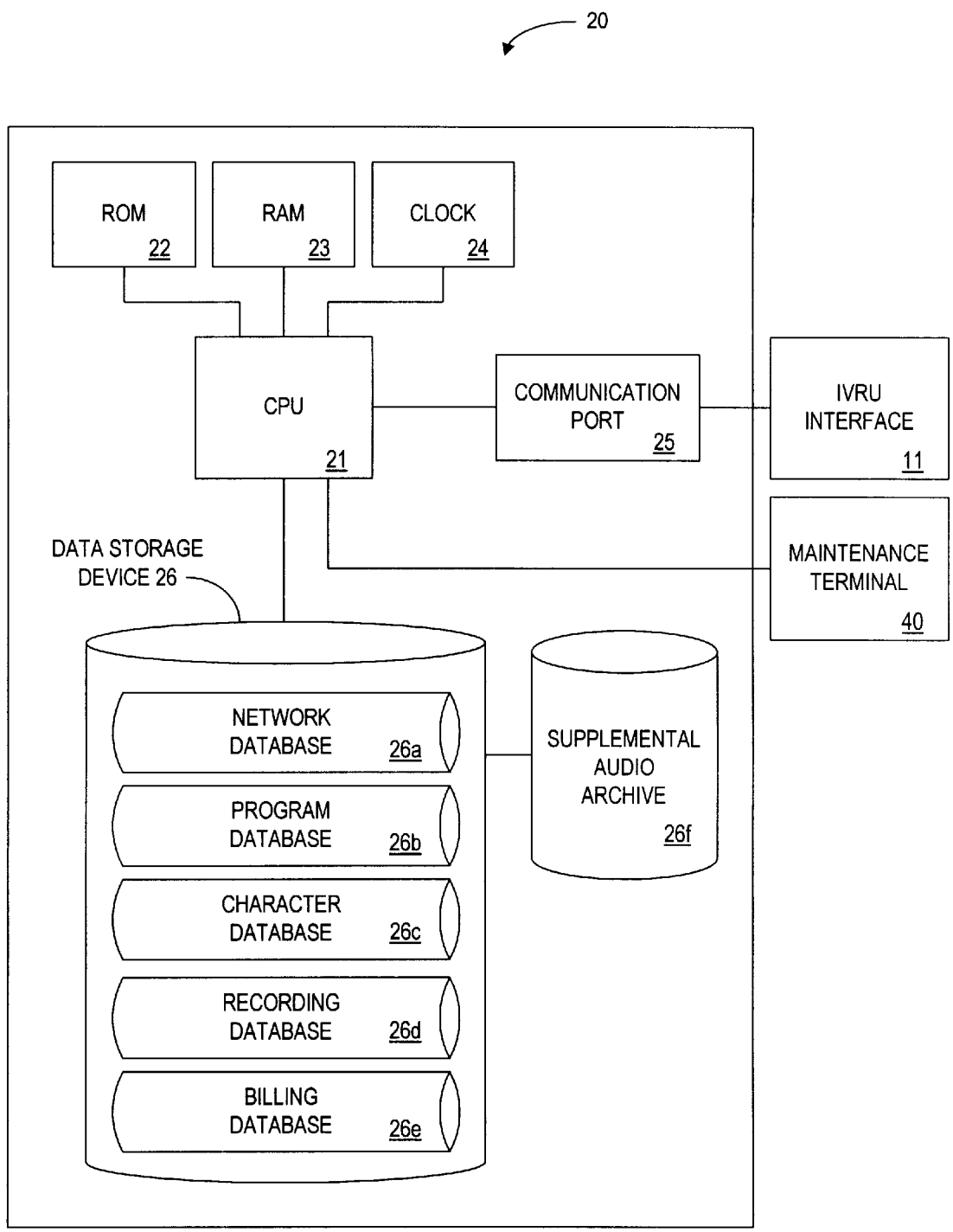
FIG. 2 is a block diagram of the service controller of FIG. 1.

FIG. 2 is a block diagram of the preferred service controller 20. The service controller 20 includes a CPU 21 which performs the processing functions. The service controller 20 also includes a read only memory 22 (ROM) and a random access memory 23 (RAM). The ROM 22 is used to store at least some of the program instructions that are to be executed by the CPU 21, such as portions of the operating system or basic input-output system (BIOS), and the RAM 23 is used for temporary storage of data. A clock circuit 24 provides a clock signal which is required by the CPU 21.

The CPU 21 can also store information to, and read information from, a data storage device 26. The data storage device 26 includes a network database 26a, a program database 26b, a character database 26c, a recording database 26d, and a billing database 26e. These databases are described below. In addition, the data storage device 26 includes instructions which can be read by and executed by the CPU 21, thereby enabling the CPU 21 to process requests. While FIG. 2 depicts separate databases, a single database that incorporates the functions of the databases mentioned above can also be used. Additional databases may be added as needed to store a variety of other information that may be required for other purposes.

The data storage device 26 also contains all the supplemental audio information recorded for each character, the supplemental audio archive 26f as described in more detail subsequently. Any of a wide variety of storage mediums are suitable for this purpose, including, for example, audio cassettes, digital audio tapes (DAT), laser discs, and the like.

In an alternative embodiment, the service controller 20 may have an external interface for inputting supplemental information, either live or pre-recorded. This supplemental information may include, for example, live audio information or even video information coupled with an audio component. The live audio information can include, for example, alternative color commentary for sporting events (e.g., Howard Stern, a popular radio disc jockey, providing supplemental color commentary on the Superbowl), or even specific athletes wearing microphones/transmitters during the sporting contest (e.g., a customer could dial 1-900-RANGERS to hear what their favorite hockey player is saying during the game).

The service controller 20 also includes a communication port 25 connected to an inter-active voice response unit interface 11. The communication port 25 enables the CPU 21 to communicate with external devices. An IVRU 12, as shown in FIG. 1, is linked to the service controller 20 via the IVRU interface 11. The IVRU 12 is connected to the PSTN 10.

A plurality of telephone trunks (not shown) terminate at the IVRU 12 to allow multiple callers (i.e., customers) to call the IVRU 12 simultaneously. These telephone trunks may be analog or digital. The IVRU 12 may also terminate North American standard digital signal one (1.544 Mb/sec) facilities in a manner similar to a private-branch exchange (PBX).

The IVRU 12 allows the customer to communicate with the service controller 20 using his or her telephone (not shown). Voice command prompts guide the customer through various menu options allowing the customer to communicate and obtain information from the service controller 20.

FIG. 3 is a pictorial representation depicting the information stored in the network database 26a. The network database 26a comprises information related to each TV program provider or distributor associated with the present invention. The network database 26a includes a network name field F1, a network identification number field F2, and a number of participating programs field F3. The network identification number field F2 is a unique two digit code corresponding to each network or TV program provider. While only four records R1–R4 for four networks are depicted in FIG. 3, any number of records may be stored. It is also understood that independent and syndicated broadcast program providers may also be included in this database.

FIG. 4 is a pictorial representation of the content of the program database 26b. The program database 26b comprises information related to each television program 30 for which supplemental information is available. The program database 26b includes a program name field F4, a program identification number field F5, a network identification number field F6 (corresponding to field F2 of the network database 26a), a broadcast times field F7, a participating characters field F8, and a phone number field F9. The program identification number field F5 is a unique four digit code corresponding to each TV program. The participating characters field F8 contains the names of various characters for which supplemental audio information is available. The phone number field F9 includes a unique telephone number associated with each television program 30. This unique telephone number is dialed by the customer to request supplemental audio information related to that particular television program 30. Other fields are described in greater detail below. Any number of records R5 may be stored in this database.

FIG. 5 is a pictorial representation of the layout and the information stored in the character database 26c. The character database 26c comprises information related to specific characters for which supplemental audio information is available. The character database 26c includes a character name field F10, a character number field F11, and a program identification number field F12 (corresponding to field F5 in database 26b). While only four records R6–R9 for four characters are depicted in FIG. 5, any number of records may be stored.

FIG. 6 is a pictorial representation of the layout of the recording database 26d. The recording database 26d comprises information related to the supplemental audio information which may be provided to a particular customer. The recording database 26d includes a program identification number field F13 (corresponding to field F5 in the program database 26b), an episode number field F14, a character number field F15 (corresponding to field F11 in the character database 26c), a time-code received field F16, a recording number field F17, and a telephone number dialed field F18. The time-code received field F16 is discussed in more detail below. Any number of records R10 may be stored in this database.

FIG. 7 is a pictorial representation of the layout and the information stored in the billing database 26e. The billing database 26e includes a caller telephone number field F19, a 900 number dialed field F20, a program identification number field F21 (corresponding to field F5 in the program database 26b), a character number field F22 (corresponding to field F11 in the character database 26c), a recording number field F23 (corresponding to field F17 in the recording database 26d), a total time expired field F24, a final dollar amount F25, and a caller verified rate field F26. While only four records R11–R14 are depicted in FIG. 7, any number of records may be stored. To conserve storage space on the data storage device 26, records may be transferred to a different storage device or deleted after some predetermined time interval or after a predetermined event such as receipt of payment from the customer.

It is understood that the records and information stored within all the databases may be updated as needed, for example, when a new character is added or a show is deleted from the databases. This is accomplished through a maintenance terminal 40 operatively connected to the service controller 20.

Figure 8:
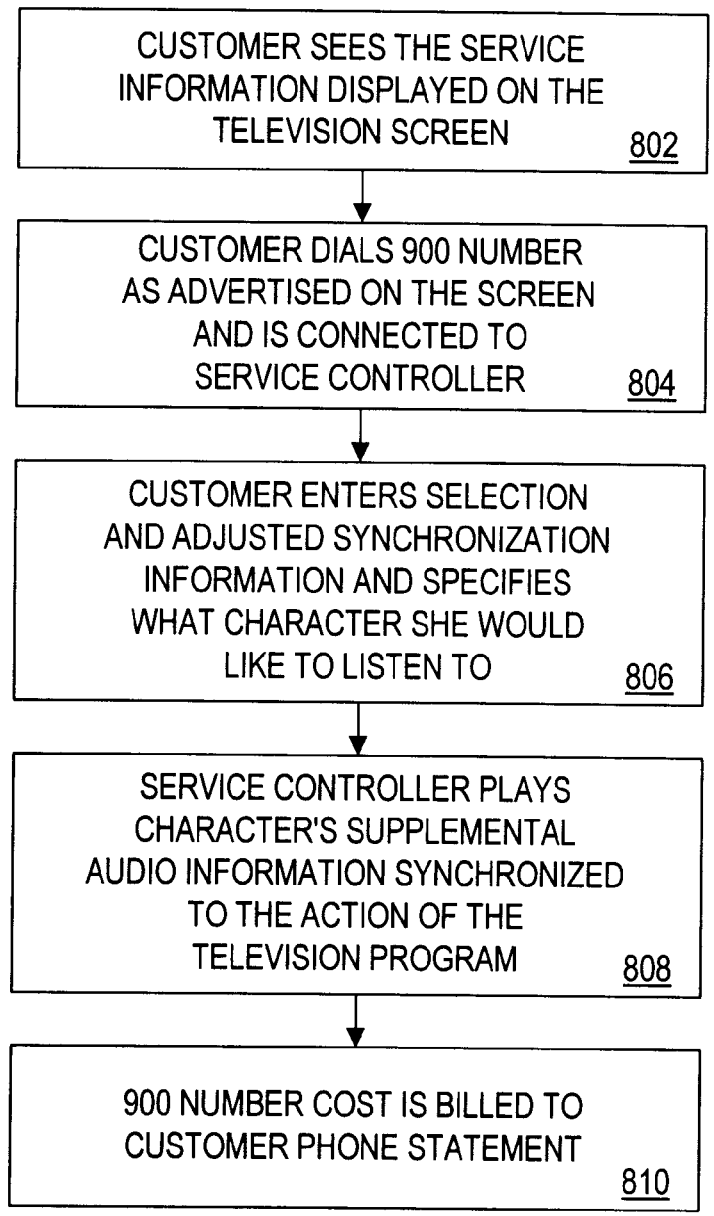
FIG. 8 is a flow chart of the operation of the system.

FIG. 8 is a flow chart depicting an exemplary operation of the preferred embodiment of the present invention from the point of view of a customer. The process starts when the customer sees the service information 31 displayed on a TV screen while viewing the television program 30 in step S1.

As mentioned above, the service information 31 comprises three components: a 900 telephone number, selection information and synchronization information, as described in detail below. In this embodiment, one general 900 telephone number is provided for all the TV programs, and the selection information, is used to select particular supplemental information for the television program 30.

The synchronization information comprises a running time-code that is updated on the TV screen at predetermined intervals. The preferred interval for updating the time-code is every second. However, other intervals can also be used, for example, the time-code could be updated at specific milestones during the television program 30.

The time-code ensures that the supplemental audio information is properly synchronized to the TV program 30. It also allows the supplemental audio information to be synchronized to a TV program that has been taped using a video cassette recorder (VCR). Thus, the customer may listen to supplemental audio information for a TV program while it is being broadcast, or during a time-shifted playback of a previously broadcast TV program.

An example of the time-code in the preferred embodiment is the number "3600." In this case, the time-code indicates that the supplemental audio information should be offset by sixty minutes and zero seconds (i.e., 3600 seconds, which is exactly sixty minutes). Of course, time-codes greater than four digits can also be used if greater offsets are required.

As understood by one of ordinary skill in the art of telephony, 900 telephone numbers provide services (e.g. weather or sports information) for which the caller is charged a pre-determined rate per minute of use. In a similar manner, the customer is charged for supplemental audio information provided.

In an alternative embodiment, a unique 900 telephone number for each television program 30 may be used, instead of one general 900 telephone number. In such an embodiment, the service controller 20 determines which television program 30 is being viewed by the customer based on the unique 900 telephone number dialed. In another embodiment, 800 or 888 numbers may also be used. In such an embodiment, the customer is prompted for a credit card number to pay for the supplemental audio information. Arrangements could also be made for pre-paid minutes or service credits for particular customers.

By utilizing his or her telephone, the customer communicates to the service controller 20 by making a conventional telephone call. In step S2, the customer dials the 900 telephone number, which is provided as part of the service information 31, and is connected to the service controller 20. After the connection is made, the customer is prompted via recorded voice messages to enter selection information and synchronization information related to the program being viewed. The telephone's keypad is used to enter this information. Alternatively, voice recognition software within the IVRU 12 could also be used to respond to voice commands from the customer.

After entering the synchronization information consisting of the time-code, the customer can optionally adjust the entered time-code to ensure a close match with the running time-code on the television program 30. In particular, recorded messages transmitted from the IVRU 12 can prompt the customer to adjust the time-code using the telephone keypad. For example, the "pound" key can be used to increment the value of the time-code, and the "star" key to decrement the value of the time-code.

The customer then listens to a menu listing of characters. In step S3, the customer selects which character (or group of characters) in the television program 30 for which he or she desires to receive supplemental audio information. Optionally, the customer may be provided with additional menu choices such as the option of purchasing supplemental audio information for the entire television program 30 or just a portion.

In step S4, the service controller 20 plays the selected supplemental audio information synchronized to the action occurring on the television program 30. The supplemental audio information is synchronized so that it does not overlap with the spoken dialogue of the television program 30, but supplements it during appropriate pauses or gaps. The customer receives the supplemental audio information via the telephone. Of course, the customer can use a speaker phone or other speaker means to facilitate listening to the supplemental audio information.

In an alternative embodiment, an interface via the Internet may also be provided allowing the customer to receive the supplemental audio information, as well as make the request for the supplemental audio information. This Internet interface may also be used to receive supplemental video or text information from the service controller 20 related to the particular television program 30 selected by the customer. For example, the text of a note handed between two characters on a TV program 30 could be displayed on a commercially available web browser running on a computer connected to the Internet.

The service charges are billed to the customer's periodic telephone statement in step S5. In the customer's periodic telephone statement, an itemized listing of the charges appear for each supplemental audio information received. Of course, the customer may be billed in other ways, such as a separate statement for each use. Alternatively, instead of a 900 telephone number, an 800 or 888 telephone number may be provided through which the customer would also be prompted to enter a valid credit card number to be billed for the service.

Figure 9A:
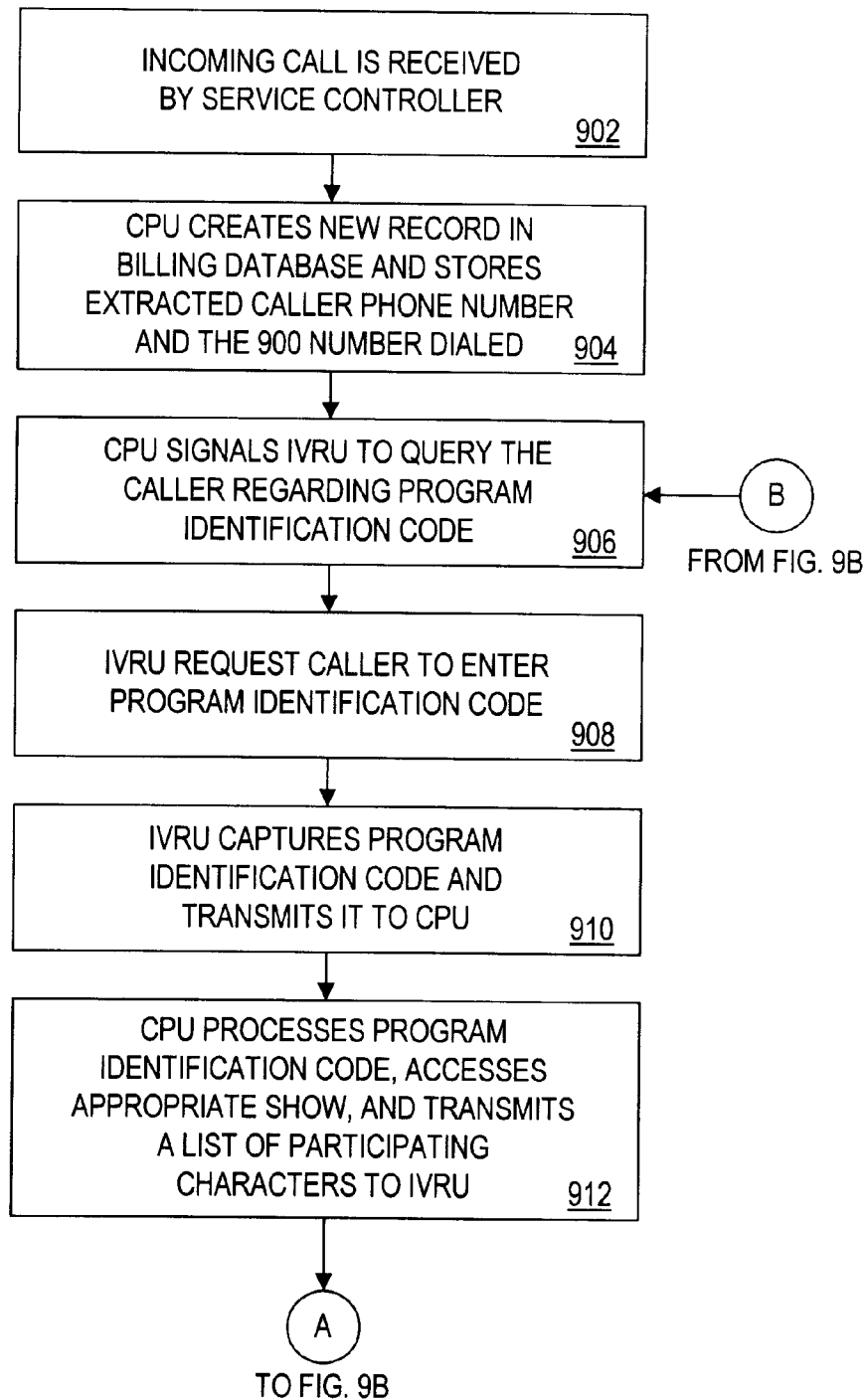
FIGS. 9a and 9b are flow charts of the operation of the service controller.
Figure 9B:
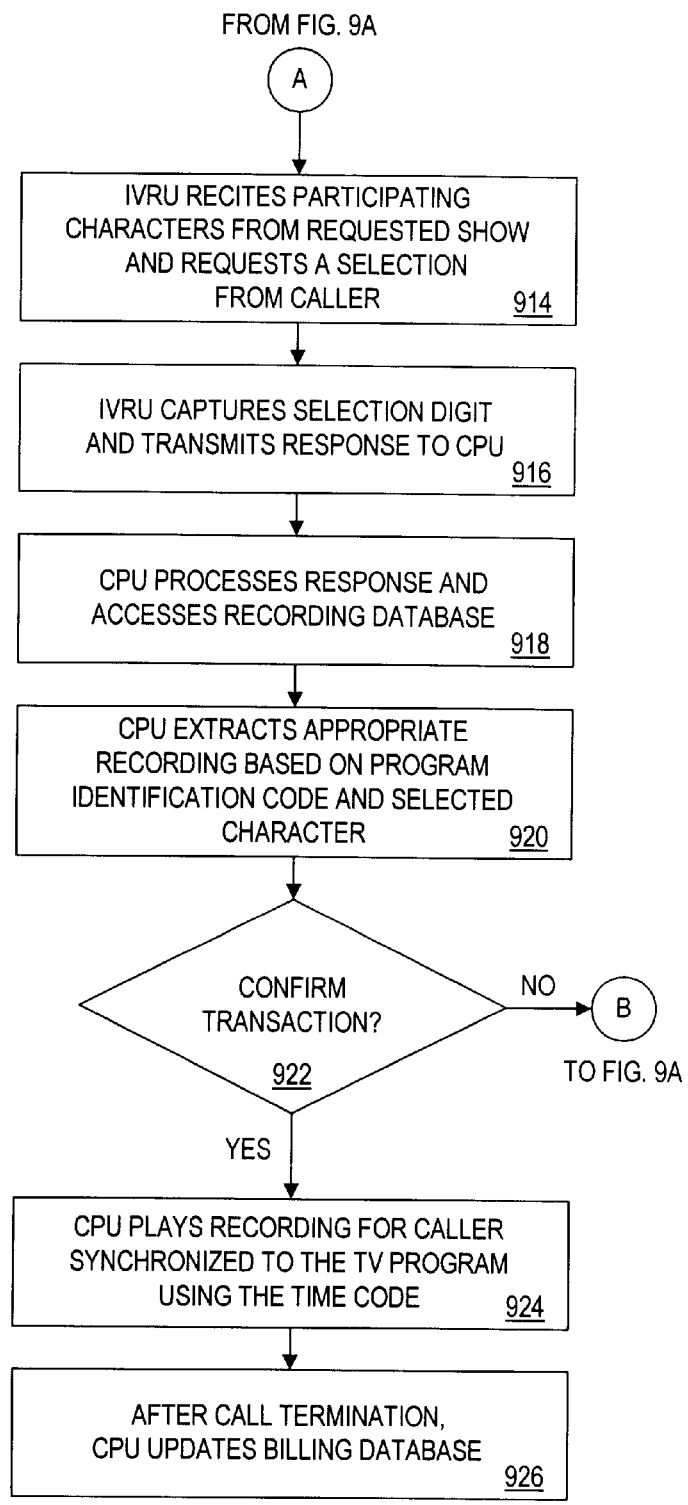

FIGS. 9a and 9b are flow charts of the exemplary operation of the service controller 20 after the customer dials the 900 telephone number and is connected to the service controller 20 via the PSTN 10. The steps of the process shown in FIGS. 9a and 9b may be implemented in a computer program that may be installed at the service controller 20 from a computer readable medium and then stored therein in one or more of the ROM 22, the RAM 23 and the data storage device 26 (shown in FIG. 2).

After the incoming call has been received by the service controller 20 in step S6, the CPU 21 creates in step S7 a new record in the billing database 26e (shown in FIG. 2). Stored in the appropriate fields (F19 and F20, respectively in FIG. 7) in this new record are the caller's telephone number and the 900 telephone number dialed by the caller. As understood by one of ordinary skill in the art of telephony, the caller's telephone number is received from a telephone switch that established the connection through the PSTN 10.

In steps S8–S10, the CPU 21 requests and receives the program identification code from the caller via the IVRU 12. The program identification code is processed, as discussed in detail below, by the service controller 20 in step S11. Also in step S11, the CPU 21 accesses the program database 26b and retrieves the list of participating characters for the particular television program 30. The list is then transmitted to the IVRU 12.

In step 12, the caller (i.e. the customer) receives a recorded voice message from the IVRU 12 comprising a menu of the participating characters to choose from. The caller's character selection is captured and transmitted to the CPU 21 by the IVRU 12 in step S13. This information is processed by the service controller 20 which then accesses the recording database 26d.

The recording database 26d contains identifying information for all the supplemental audio information stored within the data storage device 26 or accessible by the CPU 21. Based on the program identification code and character selection entered by the caller, the CPU 21 in step S15 obtains the appropriate supplemental audio information stored in the data storage device 26 or accessible by the CPU 21.

Before the supplemental audio information is communicated, the caller is prompted to confirm the transaction in step S16. This includes confirming the supplemental audio information selected by the caller as well as billing information. If the caller decides not to complete the transaction, he or she can simply hang up the telephone or start the process over to select different supplemental audio information.

After confirmation, the CPU 21 in step S17 communicates the supplemental audio information, which is synchronized to the action occurring on the television program 30 using the time-code entered by the caller. This is accomplished, as described above, by starting the supplemental information using the time-code as an offset. The CPU 21 starts playback of the supplemental audio information accordingly, based on the entered time-code.

After the call termination (i.e. the supplemental audio information is complete or the caller hangs up the telephone), the CPU 21 in step S18 updates the caller's record in the billing database 26. This record is used to track the cost of the call. The actual billing is done by the phone company, who, upon receipt of payment from the caller, reimburses the service for the cost of the content. The service charge information is sent to the caller's telephone service provider and appears on the caller's monthly or periodic telephone statement. Of course, alternate methods of payment may be used instead, including credit card transactions, debit cards, or the caller could receive a separate bill for each use and pay by check or similar means. In these cases, the billing database would be used to actually bill the customer and/or interact with a credit card company.

The revenues generated by the service can be distributed in a variety of ways among the various persons and organizations providing the service (i.e. the TV program provider, the 900 service provider, the actors, etc.).

Figure 10A:
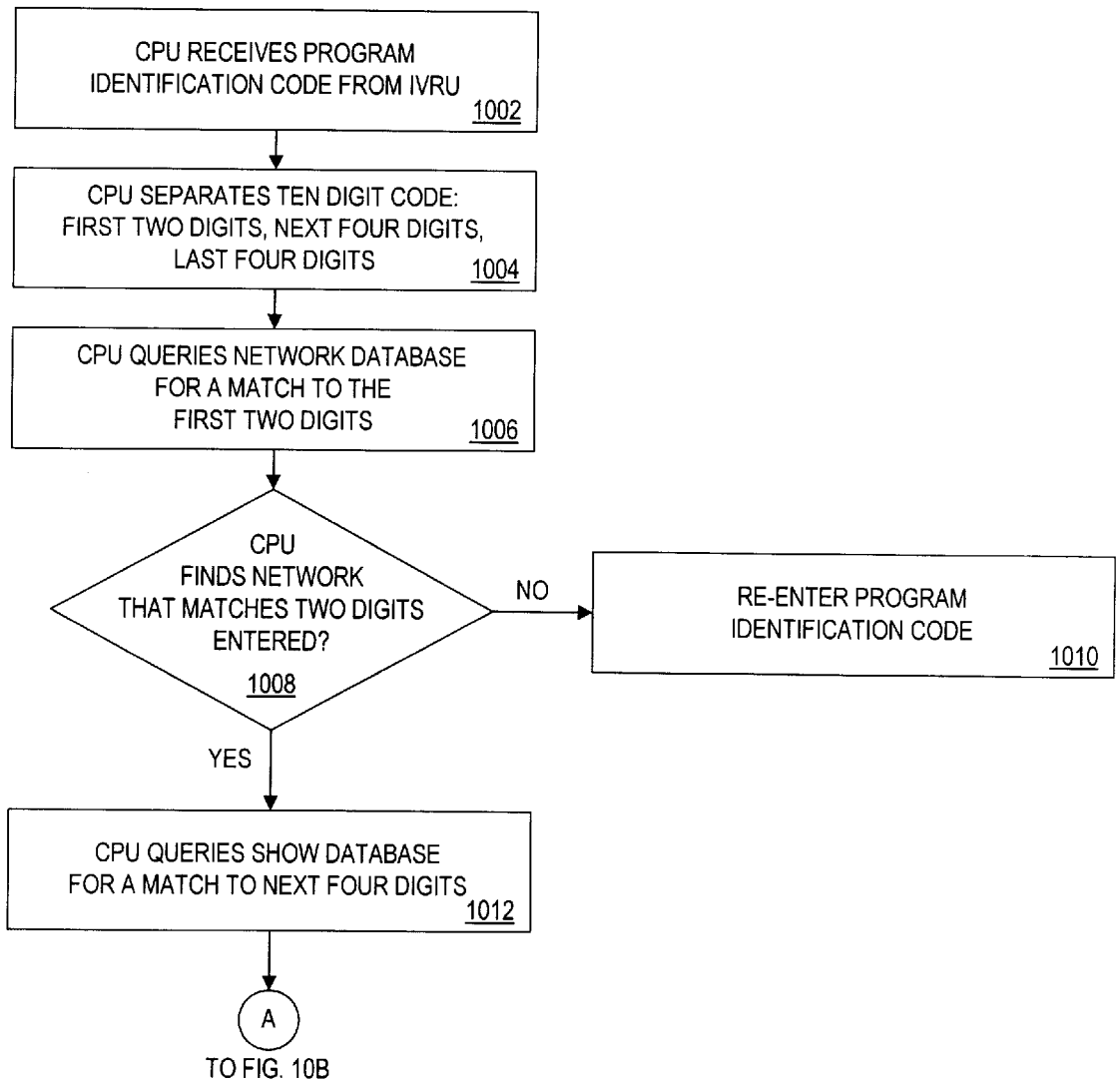
FIGS. 10a and 10b are flow charts depicting how the service controller processes information received from the IVRU.
Figure 10B:
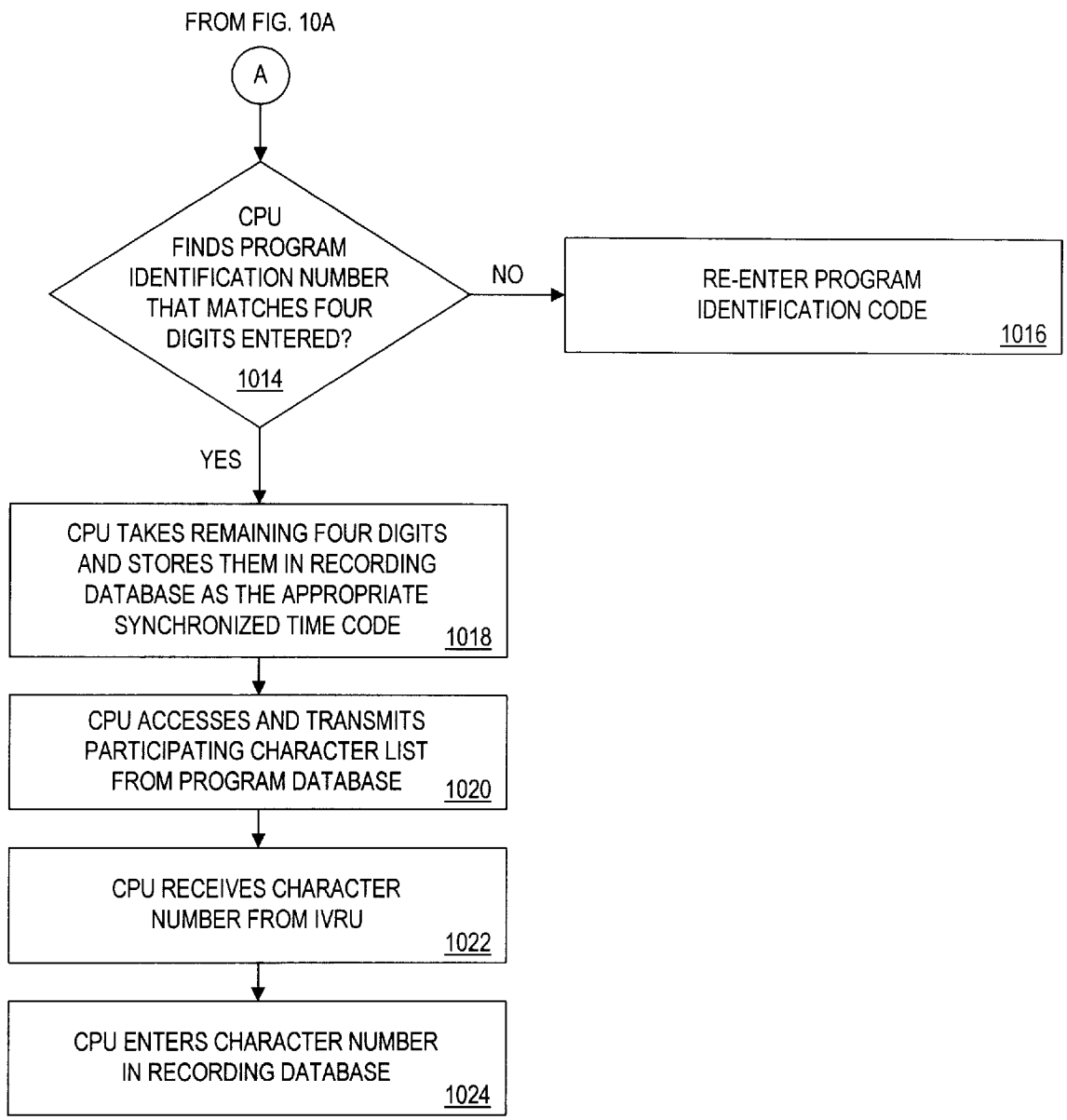

FIGS. 10a and 10b are flow charts depicting how the service controller processes information received from the IVRU 12. In step S19, the CPU 21 receives the ten digit alphanumeric string from the IVRU 12. These ten digits represent the program identification code which is entered by the customer via his or her telephone, as discussed above.

In step S20, the CPU 21 separates the ten digit string as follows: the first two digits, the next four digits, and the last four digits. As described below, the separated strings represent program selection information and synchronization information related to the broadcast television program 30.

The first two digits represent the network identification number for the television program 30. In step S21, the CPU 21 searches for a match in the network identification number field F2 of the network database 26a. If no match is found in step S22, the CPU 21 prompts the customer via the IVRU 12 to reenter the program identification code in step S23. Otherwise, the CPU 21 continues to step S24.

The next four digits of the program identification code represent the program identification number. In step S24, the CPU 21 searches for a match in the program identification number field F5 of the program database 26b. If no match is found in step S25, the CPU 21 prompts the customer via the IVRU 12 to reenter the program identification code in step S26. Otherwise, the CPU 21 continues to step S27.

Alternatively, the program identification code can have more than ten digits. This would allow additional information to be entered by the caller, for example, an episode number. The last four digits of the program identification code represent the synchronization information (i.e the time-code).

In step S27, the CPU 21 stores the time-code in a new record created for the customer in the recording database 26d. Once the time-code has been received (and adjusted), the CPU updates the time-code at the predetermined intervals to ensure proper synchronization with the television program 30 is maintained. Other information including the program identification number and the number dialed by the caller are also stored in the new record.

In an alternative embodiment, the synchronization information may be derived by the service controller 20 directly from the television program 30. The user, for example, could hold the telephone up to the speaker of the television so that the service controller 20 could receive the synchronization information. The service controller 20 would monitor the audio component of the television program 30 and compare it with the corresponding audio track (i.e. a duplicate) stored at the service controller 20. Using the stored copy, the service controller 20 would synchronize the supplemental audio information without requiring the customer to enter any additional information.

The CPU 21 accesses the participating characters field F8 in the program database 26b and transmits the list to the caller via the IVRU 12 in step S28. The CPU 21 receives from the caller via the IVRU 12 the character selection number in step S29. Once again, the caller enters this information using his or her telephone keypad. The character selection number is a two digit alphanumeric string. The CPU 21 receives it and enters it in the appropriate field in the recording database 26d in step S30.

In an alternative embodiment, the supplemental audio information may be used to offer services such as foreign language translations of TV programs and descriptive audio for the blind.

While the present invention has been described above in terms of specific embodiments, it is to be understood that the invention is not intended to be confined or limited to the embodiments disclosed herein. On the contrary, the present invention is intended to cover various methods, structures and modifications thereof included within the spirit and scope of the appended claims.

What is claimed is:

1. A data processing apparatus for providing supplemental broadcast information, comprising:
   a CPU;
   a storage device operatively connected to said CPU;
   an apparatus, adapted for communicating with said CPU, for receiving a request from a caller over a telephone network for supplemental information related to a broadcast television program and for relaying the request to said CPU; and
   a program, stored on the storage device, adapted to be executed by said CPU, for processing the request for supplemental information and for transmitting the requested supplemental information through said apparatus,
   wherein the supplemental information comprises audio information recorded on a recording medium, and
   wherein said information recorded on the recording medium comprises supplemental dialogue for a character within the broadcast television program.

2. The apparatus according to claim 1, wherein a playback of said supplemental dialogue does not overlap dialogue spoken by any character within the broadcast television program.

3. The apparatus according to claim 1, wherein said storage device contains a database to store the supplemental information, and said program stored within said storage device is further adapted to perform maintenance related to said database.

4. The apparatus according to claim 1, wherein the supplemental information comprises live audio information.

5. The apparatus according to claim 1, wherein said apparatus comprises an IVRU including a plurality of voice messages, and wherein said voice messages are used to communicate to, and obtain information from, the caller.

6. A data processing apparatus for providing supplemental broadcast information, comprising:
a CPU;
a storage device operatively connected to said CPU;
an apparatus, adapted for communicating with said CPU, for receiving a request from a caller over a telephone network for supplemental information related to a broadcast television program and for relaying the request to said CPU; and
a program, stored on the storage device, adapted to be executed by said CPU, for processing the request for supplemental information and for transmitting the requested supplemental information through said apparatus,
wherein the request for supplemental information includes providing selection information and synchronization information.

7. The apparatus according to claim 6, wherein the synchronization information comprises a time-code; and
said program is further adapted to update said time-code at predetermined intervals, and to use said time-code to synchronize the supplemental information to an audio component of the broadcast television program.

8. A method for providing entertainment, comprising:
receiving a request from a requester for supplemental information relating to a television program being broadcast at the time of the request;
processing the request for supplemental information;
transmitting the requested supplemental information to the requestor at times when an audio component of the television program and the transmission of the requested supplemental information do not conflict with each other.

9. A system, comprising:
means for broadcasting a television program including an audio component and a video component;
at least one supplemental component for said broadcast television program;
a data processing apparatus including a CPU and a storage device operatively connected to said CPU, said storage device also containing a program, adapted to be executed by said CPU, for receiving a request for said supplemental component, processing the request for said supplemental component, and providing a playback of the requested supplemental component which is time synchronized to said audio component of said broadcast television program.

10. The system according to claim 9, wherein the broadcast television program is selected from the group consisting of a live broadcast and a prerecorded broadcast.

11. The system according to claim 9, wherein the playback of the requested supplemental information is transmitted via a telephone network interface.

12. The system according to claim 9, wherein said video component of said broadcast television program contains synchronization information and selection information.

13. The system according to claim 12, wherein the program is further adapted to receive and process said synchronization information.

14. The system according to claim 9, wherein the program is further adapted to receive the request for said supplemental component from a telephone network interface.

15. A method for providing entertainment using a data processing apparatus including a CPU and a storage device operatively connected to the CPU and containing a program adapted to be executed by the CPU for processing a request for supplemental information and providing a playback of the requested supplemental information, said method comprising the steps of:

broadcasting a television program including an audio component and a video component;

receiving a request for the supplemental information related to the television program, where the request includes synchronization information;

processing the request for the supplemental information by having the CPU in the data processing apparatus execute the program;

synchronizing the requested supplemental information to the audio component of the television program using the synchronization information; and transmitting the requested supplemental information.

16. The method according to claim 15, wherein the requested supplemental information is live audio information.

17. The method according to claim 15, wherein the requested supplemental information is prerecorded on a recording medium.

18. The method according to claim 15, further comprising the step of recording on a recording medium the supplemental information.

19. A method for providing visual and audio entertainment, comprising the steps of:

broadcasting a television program including an audio component and a video component;

receiving a request from a requester for supplemental information related to the television program;

processing the request for the supplemental information;

transmitting the requested supplemental information to the requester at times when the audio component of the television program and the playback of the requested supplemental information do not conflict.

20. The method according to claim 19, further comprising the step of updating a database indicating that the requested supplemental information has been transmitted in said transmitted step.

21. The method according to claim 19, wherein the broadcasting step further comprises broadcasting ordering information for the supplemental information.

22. The method according to claim 19, wherein the broadcasting step further comprises broadcasting synchronization information related to the television program.

23. A method according to claim 22, wherein the step of broadcasting the synchronization information further comprises broadcasting a time-code that is updated at predetermined intervals and which is used to synchronize the supplemental information to the television program broadcast in said transmitting step.

24. The method according to claim 22, wherein the step of receiving the request for the supplemental information includes receiving the synchronization information from the requestor.

25. A method for requesting supplemental information related to at least one character within a broadcast television program including an audio component and an video component, comprising the steps of:

viewing the broadcast television program;

requesting supplemental information for the character within the broadcast television program; and receiving the requested supplemental information for the character synchronized with the audio component of the broadcast television program.

26. A signal containing information for requesting supplemental audio information relating to program information conveyed by the signal, the supplemental audio information not being part of the program information, comprising:

a program including a video signal component and an audio signal component for transmission to at least one display device; and service information included as part of said video signal component, said service information including a multi-digit code for identifying said program, a telephone number to be dialed for requesting the supplemental audio information and synchronization information for synchronizing the supplemental audio information with the said audio signal component of said program, wherein said synchronization information is updated at a predetermined interval.

27. A data processing apparatus for providing supplemental information, comprising:

a CPU;

a storage device operatively connected to said CPU;

an apparatus, adapted for communicating with said CPU, for receiving a request from a caller over a telephone network for supplemental information related to a broadcast television program and for relaying the request to said CPU; and a program, adapted to be executed by said CPU, for processing the request for supplemental information and for transmitting the requested supplemental information through said apparatus, wherein the supplemental information comprises supplemental dialogue for a character within the broadcast television program.

28. A method comprising the steps of:

broadcasting a television program including an audio component and a video component;

receiving a request for supplemental information related to the television program, wherein the request includes synchronization information;

synchronizing the requested supplemental information to the audio component of the television program using the synchronization information; and transmitting the requested supplemental information.

29. The method according to claim 28, wherein the requested supplemental information is live audio information.

30. The method according to claim 28, wherein the requested supplemental information is prerecorded on a recording medium.

31. The method according to claim 28, further comprising the step of recording the supplemental information.

* * * * *